United States Patent [19]

Beauchesne

[11] Patent Number: 5,777,876
[45] Date of Patent: Jul. 7, 1998

[54] DATABASE MANUFACTURING PROCESS MANAGEMENT SYSTEM

[75] Inventor: Robert C. Beauchesne, Brockton, Mass.

[73] Assignee: Bull HN Information Systems Inc., Billerica, Mass.

[21] Appl. No.: 580,565

[22] Filed: Dec. 29, 1995

[51] Int. Cl.$^6$ .................................................. G06F 19/00
[52] U.S. Cl. ........................ 364/468.01; 364/468.02; 364/468.03; 364/468.05; 364/468.1
[58] Field of Search ................... 364/468.01, 468.02, 364/468.03, 468.04, 468.05, 468.06, 468.08, 468.1, 468.13, 468.14, 468.22, 468.23, 468.24, 468.28, 148, 149, 150–151, 578; 395/601, 611–614, 615

[56] References Cited

U.S. PATENT DOCUMENTS 5,418,728  5/1995  Yada ......................... 364/468.01
5,440,478  8/1995  Fisher et al. .................. 364/468.01
5,495,417  2/1996  Fuduka et al. ..................... 364/578
5,630,041  5/1997  Mills et al. ..................... 364/468.04

*Primary Examiner*—Reba I. Elmore
*Assistant Examiner*—Thomas E. Brown
*Attorney, Agent, or Firm*—Faith F. Driscoll; John S. Solakian

[57] ABSTRACT

A database system provides a manufacturing factory environment which integrates a plurality of manufacturing processes used to control the manufacture of a number of electronic board products on a plurality of manufacturing lines. The database system responds to operator initiated commands and provides a predetermined number of control table structures in memory for storing predetermined types of control parameter entries used in controlling the manufacturing processes. The database system includes a number of control mechanisms which in response to operator commands perform sequences of operation for enabling process steps to be added, applied or linked to other processes or modified in a reliable and efficient manner.

35 Claims, 14 Drawing Sheets

| PROCESS INFORMATION CONTROL SYSTEM - MAIN MENU | | | | | | |
|---|---|---|---|---|---|---|
| Shop FLoor | Products | Forms | History | Exit | Help | |

| Line # | Oper. | Unit | Description |
|---|---|---|---|
| ML_A | 1000 | 4081 | prep_area |
| ML_A | 2000 | 9823 | assembly |
| ML_A | 3000 | 2643 | Test |
| ML_A | 8000 | 4317 | Shipping |
| ML_B | 1000 | 3911 | Prep_area |
| ML_B | 2000 | 8123 | Assembly Line B |
| ML_B | 3000 | 5323 | Test |
| ML_B | 8000 | 6573 | Shipping |
| ML_N | 1000 | 4111 | Material prep |
| ML_N | 2000 | 9123 | Assembly n |

← 500b

Line Name — ML_A
Unit Desig. — 2643
Unit Name — Test
Seq Numb — 3000
Unit Type — ICT_Test
Maint SOD — J-325
Training — Skl41

Process Information Control System-Main Menu

Shop Floor | <u>P</u>roducts | <u>F</u>orms | <u>H</u>istory | <u>E</u>xit | <u>H</u>elp

500c

| Product | Rev | Ver |
|---------|-----|-----|
| PROD_123 | A | B |
| PROD_123 | R1 | A |
| PROD_123F | A | B |
| PROD_235 | 3 | A |
| PROD_235 | 3 | B |
| PROD_U123 | A | A |
| PROD_U123 | A | B |
| PROD_U123 | B | A |
| PROD_U123 | C | A |

PROD_U123 — 502c

| | |
|---|---|
| Prod_Desig | |
| Prod_rev | A |
| Prod_ver | A |
| Generic name | UV Sensor |
| Customer_info | Std. UV Model |
| Build Status | VERI |
| Product Recipe | 5120714554 |
| Current Rev | 5121307574 |
| Previous Rev | 5120715085 |
| Comments | Line A version |
| Source Loc | B14 |
| File Date | 12/12/95 |

504c

| Oper# | Line | Unit | Description |
|-------|------|------|-------------|
| 1000 | ML_A | 4081 | prep_area |
| 2000 | ML_A | 9823 | assembly |

*Figure 5c*

Process Information Control System - Main Menu

Shop Floor | Products | Forms | History | Exit | Help

500d

| Line # | Oper. | Unit | Description |
|--------|-------|------|-------------|
| ML_A | 1000 | 4081 | perp_area |
| ML_A | 2000 | 9823 | assembly |
| ML_A | 3000 | 2643 | Test |
| ML_A | 8000 | 4317 | Shipping |
| ML_B | 1000 | 3911 | Prep_area |
| ML_B | 2000 | 8123 | Assembly Line B |
| ML_B | 3000 | 5323 | Test |
| ML_B | 8000 | 6573 | Shipping |
| ML_N | 1000 | 4111 | Material prep |
| ML_N | 2000 | 9123 | Assembly n |

502d

| PROD_U123 | |
|-----------|--|
| Prod_Desig | |
| Prod_rev | A |
| Prod_ver | A |
| Generic name | UV Sensor |
| Customer_info | Std. UV Model |
| Build Status | VERI |
| Product Recipe | 5120714554 |
| Current Rev | 5121307574 |
| Previous Rev | 5120715085 |
| Comments | Line A version |
| Source Loc | B14 |
| File Data | 12/12/95 |

504d

| Oper# | Line | Unit | Description |
|-------|------|------|-------------|
| 1000 | ML_A | 4081 | prep_area |
| 2000 | ML_A | 9823 | assembly |

| Product | PROD_U123 | UV Light Sensor | Recipe | 5120714554 | 5120715068 |

Area ML_A  Area 3000  Test  Skill Skl 41  Key

In-Circuit Test    Estimated Pure Test Time

Fixture P_123   Program P_123VA   SOD

Unit OK — If unit Passes Test Perform the following
Send to shipping area

Unit Fails — If unit fails the test Perform the following
If UV Failure - hold for analysis
Repair & retest up to 3 times Notes — General information Select an item from the list of 3 below

2643M000_0    P_123
2643M001_0    P413
2643M002_0    P_234A

— 504f

Responsibility

Info.

Enter data in desired fields then Select RETURN

Return | Copy | Link | Cancel | Print

500f

DATABASE MANUFACTURING PROCESS MANAGEMENT SYSTEM

BACKGROUND OF THE INVENTION

1. Field of Use

The present invention relates to production systems and more particularly to production systems for manufacturing electronic assemblies.

2. Prior Art

Generally, circuit board manufacturers use processes for producing electronic board assembly products which utilize a series of major process steps. These steps are (1) assembling or mounting the electronic components on the assembly board, (2) soldering the components in place, (3) inspecting/testing the assembled board and (4) packaging the board assembly for shipment. In the case of mass production, a manufacturing facility has a production or manufacturing line for each product. Thus, such manufacturing facilities often have a large complement of different kinds of equipment partitioned into several different manufacturing lines located within large factory spaces for manufacturing a large number of different products. Also, some manufacturing facilities generally are designed to have the capability of producing the same product on one or more manufacturing lines using different equipment.

In such manufacturing environments, it often is necessary to replicate manufacturing processes in order to produce products which meet specific customer demands. Variations in vendor equipment often results in different pieces of equipment requiring that the parameters applied to the process steps be specifically tailored to each piece of vendor equipment. For example, a reflow oven purchased from one vendor may require different temperature settings than equipment of a different vendor in order to achieve the same desired performance results during the reflow process step. The same is true for the process steps of dispensing glue, the application of solder paste, the placement of components as well as almost any other manufacturing process step. Hence, there is always the potential for variations in the equipment which will require a unique set of parameters for one piece of equipment versus a comparable piece of equipment employed in a given manufacturing process step.

To address the above problem, a common approach has been to develop a series of documents which define the process flow including identifying each unit of equipment involved in such process for each product to be manufactured and the related parameter information associated with each such product. The information was made available in both hard copy and electronic form. This approach was usually limited to a single manufacturing process applied to a small number of products.

The basic difficulties with the above approach was that it was absent any mechanism for controlling revisions and any mechanism for locating product related information. Relative to revision control, there was no way provided for managing the vast amount of information required to support an entire complicated manufacturing process and the various assembly process sequences that had been validated. Relative to locating product related information, there was no consistent way of storing product related parameters. For example, where parameters had to be tailored to the specific equipment unit the information was included in information pertinent to the equipment unit. For information which was more dependent on the product, the information was included as part of the product documentation package.

Therefore, there is a need for a method and system which is capable of managing and controlling process information pertaining to a variety of different products manufactured on a number of different manufacturing lines.

SUMMARY OF THE INVENTION

The method and system of the present invention integrates products and processes within a database system which provides for the application of product related control parameters for each unique manufacturing process that might be used in a manufacturing process. In the preferred embodiment of the present invention, each unit or piece of equipment utilized for manufacturing board products in a manufacturing facility at a given physical location is uniquely identified by a unique unit designation code. That is, the unit designation code of each unit of equipment is different from the designation code of all other units of equipment of the complement of equipment being used to manufacture board products. Each such identified unit of equipment is also assigned an operation code designating a specific process step which that unit of equipment normally would perform in manufacturing a hypothetical product requiring a theoretical preestablished sequence of steps or events. This enables more than one piece of equipment to perform the same operation.

The database system of preferred embodiment of the present invention further includes a number of control mechanisms which are responsive to operator or user initiated commands entered through a graphical user interface. The database system memory is initially setup to contain a plurality of different table structures which can be operatively related or linked in a predetermined manner. In the preferred embodiment, these structures establish and control the products to be manufactured, the complement of equipment units used for manufacturing the products and the processes for manufacturing the products on specific units of equipment.

In the preferred embodiment, a first one of the table structures defined as a line list table structure is set up to define the complement of equipment units which is going to be used to manufacture board products. A second one of the table structures termed a product table structure used in conjunction with processes is initially setup to define the products to be manufactured. The product table structure includes plurality of locations organized according to product so as to be accessed using a product identifier code. Product table locations include fields for relating or lining product table entries with those of a third table structure termed a process or "recipe" table structure.

In the preferred embodiment, the recipe table structure contains a plurality of locations organized to store a predetermined set of coded control parameter entries specifying a sequence of process steps which define each process or "recipe" for manufacturing a specific product associated therewith utilizing certain partitioned units of equipment. These process steps are defined in terms of operations codes and unit designation codes of the equipment units or unique activities being performed. Additionally, the recipe table locations include fields to store parameter key values for linking recipe table location entries with those of a fourth table structure termed a parameter table structure used for storing sets of operating parameters used by the pieces of equipment specified by the unit designation codes in carrying out the recipe steps.

In the preferred embodiment, each parameter key value is developed from the associated equipment unit designation code value and a unique numerical value. This makes it possible to directly use the parameter key value as an index pointer into the appropriate area of the parameter table structure which contains the parameter settings for that particular unit of equipment. Also, this permits a large number of unique parameter sets to be defined which can be selected from and used for performing a single recipe step.

In typical manufacturing environments, several pieces or units of equipment may possess identical characteristics. Similarly, two different products may require the identical set of parameters on a given piece of equipment which results in the opportunity for sharing the same parameter data. The control mechanisms of the database system of the present invention allow a particular set of control parameters to be applied to all such units of equipment producing that product. This is easily carried out by having such control mechanisms cause the table locations for each such product to store the identical parameter key value in a way which results in the different products sharing the same set of control parameters. Also, when the manufacturing factory facility is required to manufacture a new product which has the same characteristics as an existing product, the database control mechanisms in response to user commands need only replicate the table for the existing product to have the same set of parameters apply to the new product.

Additionally, the database system of the present invention allows a common set of process parameters to be applied to the same product manufactured on a plurality of different manufacturing lines using similar units of equipment. This is accomplished by having table entries for both products contain the same parameter key values for the different units of equipment specified by different unit designation codes.

Thus, the database system control mechanisms of the present invention provide the ability to exchange control information between equipment units and process control parameters between products. Also, the database system separates equipment parameters from product parameters which provides the ability to apply individual parameter sets. The database system control mechanisms provide for the creation of process summaries when units of equipment are exchanged or transferred. Further, the database system provides for the generation of detailed control parameter forms for each equipment unit and for each product.

Also, the database system of the present invention is organized in a manner which facilitates expansion in terms of equipment units as well as lines of equipment units, products, processes and parameter sets. For example, in a typical factory, units of equipment are often physically partitioned into a plurality of manufacturing lines. In such environments, it may be desirable to start out by first setting up only one manufacturing line to manufacture one or more board products. Thus, the different table structures would be initially set up to define only the equipment units of a single manufacturing line, the one or more products to be manufactured on that line, the recipe steps which are added to each new product consistent with those of the previously defined products and the sets of parameters that are going to be used with each step for manufacturing each new product.

In adding new products, a user has the flexibility of applying the steps of existing recipes and parameter sets through linking or copying operations by invoking specific database control mechanisms. Similarly, new lines of equipment units can be easily established by invoking the database system control mechanisms for manufacturing existing or new products. In allowing the user or operator to make additions and changes, the database system control mechanisms provide the user with the necessary parameter information to make accurate and informed choices. Also, the system control mechanisms include signaling mechanisms implemented as part of the graphical user interface for preventing an operator from making certain types of changes which could impair factory operations or processes.

The above objects and advantages of the present invention will be better understood from the following description when taken in conjunction with the accompanying drawings.

BRIEF DESCRIPTION OF THE DRAWINGS

FIGS. 5a through 5f are diagrams used in describing the operation of the present invention in connection with the diagrams of FIGS. 4a and 4b.

DETAILED DESCRIPTION OF THE PREFERRED EMBODIMENT

Figure 1:
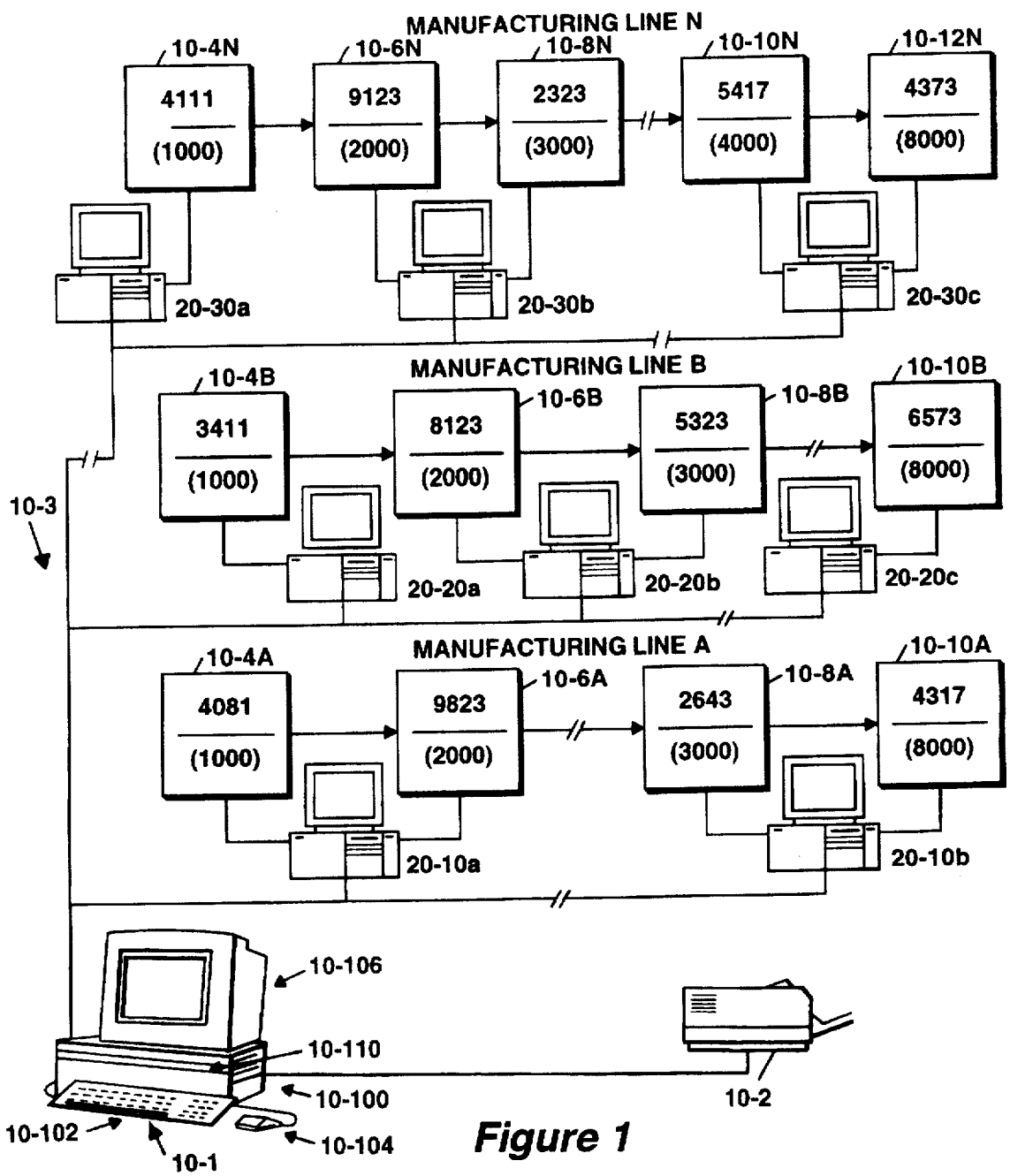
FIG. 1 is a block diagram of a manufacturing production environment which utilizes the method and database system of the present invention.

FIG. 1 is a block diagram of a factory environment which uses the database system of the present invention and which has been reduced in size and scope to permit clarity of explanation. The factory environment includes a complement of circuit board manufacturing equipment which is spread across N number of manufacturing assembly lines as shown in FIG. 1. According to the teachings of the present invention, each unit or piece of equipment is labeled with a unique identification number (e.g. 4081, 3411. These identification numbers are assigned in a manner such that no two units of equipment will have the same number. Also, each piece of equipment or step is assigned an operations code (e.g. 1000, 2000) which designates the specific process step that an operator or a particular piece of equipment would carry out in manufacturing a hypothetical product. Operation code numbers are assigned in a manner that is consistent with the generally accepted manufacturing process.

The computerized database system of the present invention is incorporated into a personal computer 10-1 which functions as a server relative to a plurality of personal computer work stations 20-10a through 20-30c. The server computer 10-1 couples to a printer 10-2. For the purposes of the present invention, these units may be considered conventional in design. The server computer 10-1 operatively connects to each piece of equipment in each of the assembly lines A, B and N through work stations 20-10a through 20-30c via a standard local area network (LAN) 10-3 as indicated in FIG. 1. The work stations 20-10a through 20-30c are configured for controlling the operation of one or more units of equipment as indicated in FIG. 1.

The database system 10-1 controls the different units of equipment in each of the assembly lines (i.e. 10-4A through 10-10A, 10-4B through 10-10B, 10-4N through 10-12N). For illustration purposes, each manufacturing line is indicated as having 4 or 5 units of equipment. But, it will be appreciated that the manufacturing lines will normally include many more units of equipment. By way of example, the manufacturing lines of FIG. 1 are assumed to include the complement of units of equipment such as board soldering equipment, inspection equipment stations and baking oven equipment and the like used in manufacturing printed circuit board assemblies. Examples of such equipment, and operations are given in an Appendix included herein.

In greater detail, the computer database system 10-1 of FIG. 1 includes a central processing unit (CPU) hardware platform 10-100 which connects to printer 10-2. The computer platform 10-100 includes disk storage, random access memory (RAM) 10-110, a keyboard 10-102, a mouse device 10-104 and a CRT display unit 10-106. The computer database system 10-1 also includes standard operating system software and graphic interface application software developed using Visual Basic software marketed by Microsoft Corporation. Such application development software also provides client/server functionality used for operating server 10-1 in conjunction with client work stations 20-10a through 20-30c via LAN 10-3.

Figure 2A:
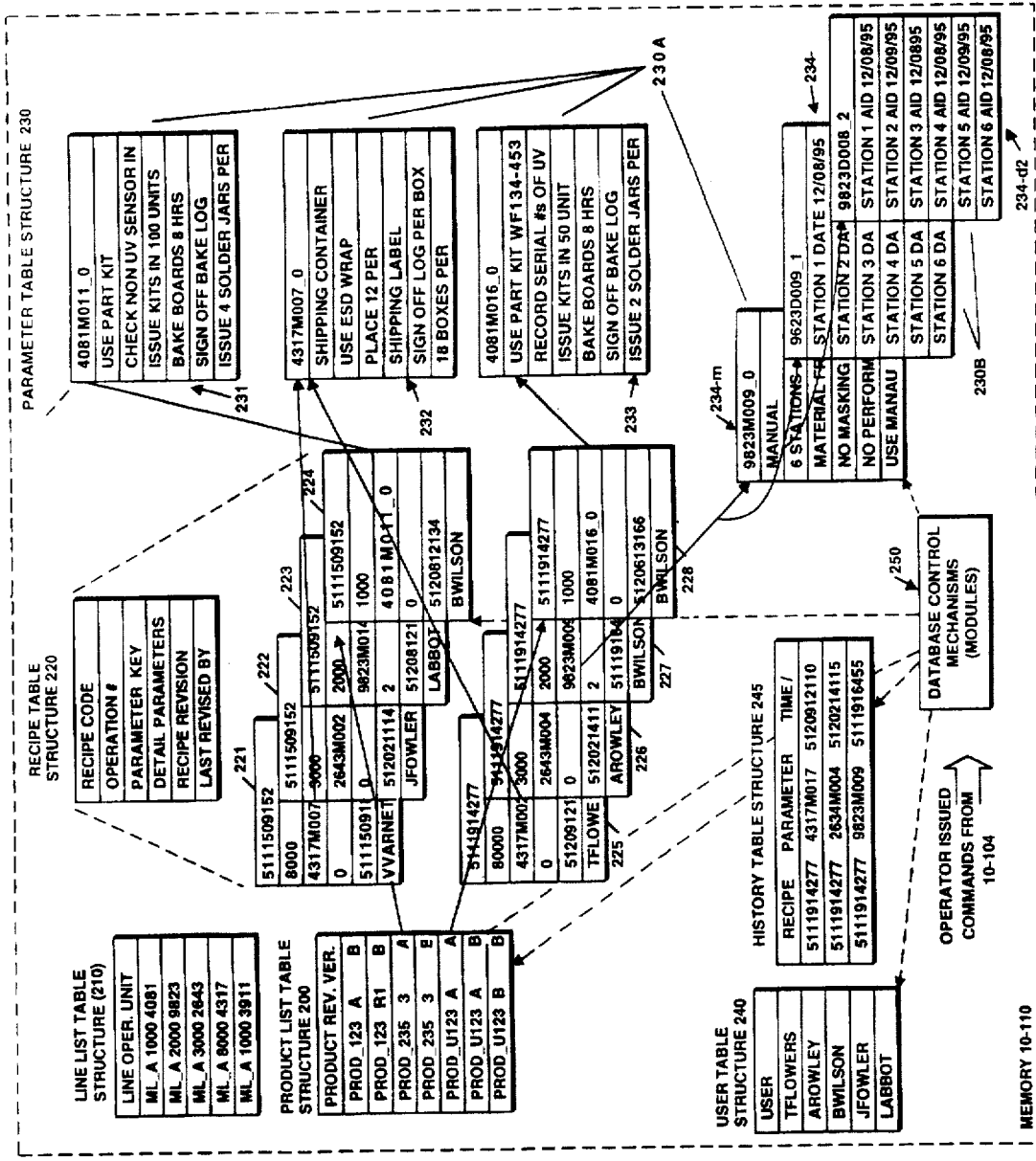
FIGS. 2a and 2b illustrate in greater detail, the organization of the manufacturing database memory system of FIG. 1 in carrying out linking and copy operations according to the teachings of the present invention.
Figure 2B:
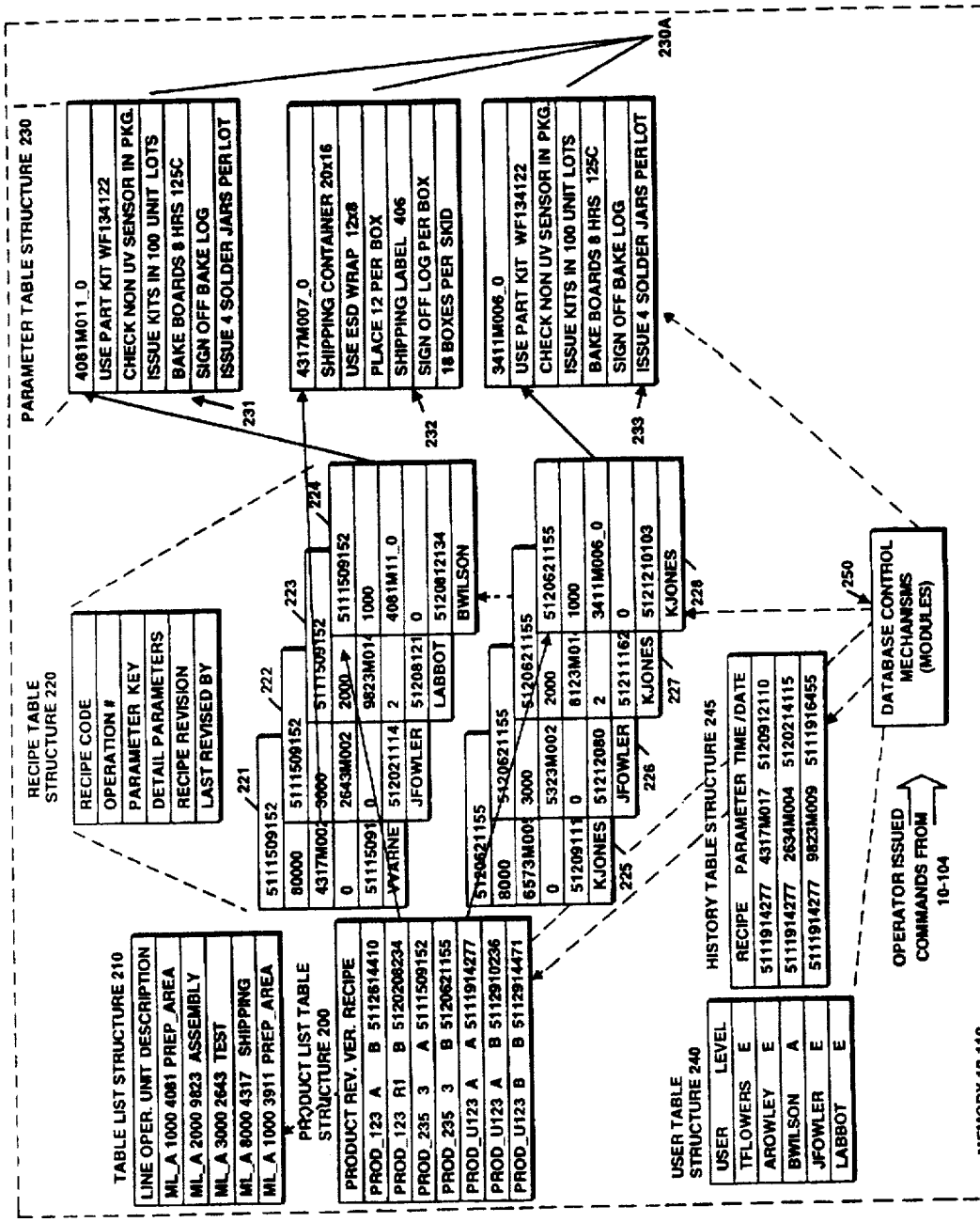

FIGS. 2a and 2b illustrate representative organizations of the database system memory 10-110 of the present invention which illustrate the operation of certain functions performed by the control mechanisms of block 250 as discussed herein. As seen from these Figures, the database system memory 10-110 includes a plurality of table database structures. These table structures include a product list table structure, a line list table structure 210, a recipe list table structure 220, a product parameter table structure 230, a user list structure 240 and a history table structure 245. Each of the table structures include a number of entry locations, each entry location containing a plurality of predefined fields. Examples of these table structures are provided in the Appendix as well as being illustrated in FIGS. 2a and 2b and in other figures.

Additionally, database memory 10-110 includes a plurality of database control function modules represented by block 250. These modules are operatively connected to receive operator initiated commands received from different menu selections made via mouse device 10-104. In response to such commands, the database system control function modules of block 250 perform predetermined sequences of operations required for managing the manufacturing operations as described herein. Now the different table structures of FIGS. 2a and 2b will be described in greater detail.

Product List Table 200

The product list table structure 200 is a single table which contains a plurality of memory locations for storing product control parameter entries pertaining to all of the product assembly boards which are to be manufactured on the number of manufacturing assembly lines of FIG. 1. In the preferred embodiment, each product control entry location of each table includes a plurality of product specific fields for storing product board specific control parameters. As indicated in FIG. 2, the main fields include a 16 digit product designation field for storing coded information defining the board type (e.g. PROD_123, PROD_235, PROD_U123) and a 4 digit product revision field for storing information coded to specify a board revision number(e.g. R1, A, 3). The product main fields also includes a 4 digit product version field for storing information coded value specifying the manufacturing version of the board indicating the particular assembly line (equipment complement) on which the board will be manufactured (e.g. A, B). A Generic name field is used for storing information which may describe the product in generic terms and this is especially useful in situations where a particular product is associated with a specific model or feature name: Taurus, Legend, etc. A customer name field is dedicated to customer related parameter information which is utilized in differentiating among the different products. A 4 character build status field is used to define the current status of the build process. Examples would include VERification, INACtive, ReLeaSD. A 10 character recipe field is used for storing a coded numeric value designating the recipe/process used in manufacturing the product (e.g. 5112614410, 5120208234). Other fields include a 10 digit current revision field, a 10 digit previous revision field, a 40 digit comment text field, a 8 digit source locating field and a 12 digit file date field. The revision field is used for storing a coded value designating the most recent revision made to any of the steps associated with the product. The previous revision field is used for storing a coded value designating the previous change.

The entries in the product list table structure 200 are accessible by a user/operator through the use of several different menu commands such as product view (MC_PROD_VIEW), product add (MC_PROD_ADD), product delete (MC_PROD_DEL) and product change (MC_PROD_CHG). These commands are described in greater detail in the Appendix.

Line List Table Structure 210

The line list table structure 210 contains a plurality of memory locations is used to store line equipment control information entries for all of the equipment and stations which constitute the N number of manufacturing assembly lines of FIG. 1. In the preferred embodiment, each entry location includes a plurality of line equipment specific fields containing coded control parameter information pertaining to a particular unit or piece of equipment. In the preferred embodiment of the present invention, it is a prerequisite that in order for a step to be added to a given process that the specific step must first appear as an entry in the Line List table structure.

As generally indicated in FIGS. 2a and 2b, the main fields include a 12 digit line name field for storing coded information designating the particular assembly line on which the unit of equipment is used as illustrated in FIG. 1 (e.g. $ML_{13}$ A, ML_B), a 8 digit unit designation field for storing coded information designating the particular unit of equipment (e.g. 4081, 9823) as indicated in FIG. 1, a 32 digit unit name field for storing coded information specifying the equipment unit or station name (e.g. Prep Area, Assembly, Shipping) and a 8 digit sequence number field for storing a coded integer value specifying the particular operation or step carried out by the particular unit or piece of equipment (e.g. 1000, 3000) as illustrated in FIG. 1. Other fields include a 8 digit unit type field, a 16 digit maintenance Standard Operating Description (SOD) field and a 8 digit training requirements field. The unit type field defines the type of form to be used with the process and a list of example form types is outlined in the Appendix.

The entries in the line list table structure 210 are accessible by a user/operator through the use of several different menu commands such as line view MC_LINE_VIEW), line add (MC_LINE_ADD), and line delete (MC_LINE_DEL). These commands are described in greater detail in the Appendix.

Recipe List Table 220

The recipe list table structure 220 contains a plurality of memory locations used to store process/recipe step control parameter information entries pertaining to all of the recipes/ processes used in manufacturing the products listed in the product list table structure 200. In the preferred embodiment, a recipe can contain hundreds of unique operations. Generally, a recipe contains 100 or less operations or steps.

As generally indicated in FIG. 2a, the main fields of each recipe entry includes a 10 digit recipe name field for storing the name of the process/recipe (e.g. manual assembly). The 10 digit value is generated by using a 10 year date/time stamp which is calibrated in tenths of a minute to ensure a series of unique values (e.g. 5120621155). Each entry also includes a 4 digit recipe sequence field for storing a numerical coded value specifying the step/operation to be performed in manufacturing the product. The assigned values for this field are 1000 through 9000 which as indicated above provide thousands of unique operations. A further field is an 8 digit unit designation field which is assigned values for uniquely designating the assigned unit or piece of equipment or unique activity in performing the particular step/operation. The system of the preferred embodiment can contain an unlimited number of product designations with each product designation having a defined recipe which may be shared by other product designations as described herein.

The recipe entry also contains a 10 digit recipe revision field for storing a recipe revision number (e.g. 5120613166) and a 10 digit master parameter key field for storing a coded value derived from the unit designation and a unique number designating the set of parameter values stored in the product parameter table structure 230 used in carrying out the designated process step or operation. As discussed herein, the value stored in the parameter key field is used to access the contents of table 230. Other fields include a 12 digit information field, a 8 digit item status field. In the preferred embodiment the information field can be used to describe a "Windows" compatible document, spreadsheet or bit map which can be displayed by double clicking on the appropriate information box on the forms screen.

The contents of entry locations in the recipe list table structure 220 are accessible by a user/operator through the use of several different menu commands such as view steps (MC__VIEW__STEPS), add step (MC__ADD__STEP), change step (MC__CHANGE__STEP) and delete step (MC__DELETE__STEP). These commands are described in greater detail in the Appendix.

Parameter Table Structure 230

The parameter table structure 230 contains a plurality of memory locations organized as two separate table structures, a main parameter table structure 230A which contains main control parameter locations for storing entries such as 231, 232, 233, and 234m-1 and a detail parameter table structure 230B containing locations for storing entries such as 231-d1 and 231-d2. The detail parameter table structure 230B is used for those forms where the number of information sources exceeds a predefined limit imposed by the main parameter table structure 230A. The reference designation for the detail parameter table structure 230B is derived from the main parameter table index entry as described herein. The main fields of the main parameter table structure 230A include a 10 digit parameter main field for storing a coded parameter key value derived by combining the unique unit designation assigned to a particular piece of equipment with a unique parameter designation. The parameter key value is used to specifically define the unique set of parameters for that product on that unit of equipment. For example, parameter key 4317M007__0 is derived from the unit designation (4317) and a next available numerical reference designation at the time that the parameter key was generated (007). The letter (M) in the reference key defines this as a Main set of parameters and the (__0) represents that it is also the first set of items in the overall parameter description. Each of the 11 fields can be used for any purpose as defined by the specific form format being applied. The names given for these fields represent a typical application.

Up to eight other detail parameter sets, each containing up to 8 detailed parameter values can be stored as entries in the detail parameter table structure 230B as indicated by entries 234-d1, and 234-d2 of FIG. 2a. The entries in the detail parameter table 230B includes a 10 digit parameter key field which is derived from the main parameter field value. That is, the letter "D" replaces the "M" and the trailing "0" of the main parameter key is replaced by the numerical value 1 to 8.

Both table structures are accessible through a 10 digit parameter key value contained in the recipe list table structure 220 as indicated in FIGS. 2a and 2b. For example as shown in FIG. 2a, PROD__235, Revision B for Line A has a recipe name of 511914277. Step 2000 of this recipe contains a parameter key value of "9823M009__0", the param__main field would contain the same value "9823M009__0" while the param__delt field could be assigned the values "9823D009__1 through "9823D009__8. In the actual example shown in FIG. 2a, only 2 detailed parameter sets are required to satisfy the requirements of the defined form as specified by the value (2) in the detail parameter field of the recipe table (227).

The entries in the parameter table structure 230 are accessible by a user/operator through the use of menu commands such as change step (MC__CHANGE__STEP). This command is described in greater detail in the Appendix.

User List and History Table Structures 240 & 245

For efficiency and speed, the table structures 240 and 245 constitute part of a single database. The user list table 240 contains a plurality of locations for storing entries specifying the names of authorized users and their respective passwords in addition to other pertinent control information, such as authorization level. More specifically, the User Level field as depicted in FIG. 2a, (240) defines what types of operations a particular user is allowed to perform. An (A) defines an administrator capable of performing all operations. An (E) defines an Engineer capable of modifying any established recipe. A (U) defines a User who only has View authority. The history table structure 245 contains a plurality of locations containing entries organized according to time and date which record changes made to the different table structures of FIGS. 2a and 2b for tracking process/recipe modifications. Most notable in FIGS. 2a and 2b are entries pertinent to the recipe involved, the parameter modified, and the time and date on which the change occurred.

DESCRIPTION OF OPERATION

With reference to FIGS. 1 through 6, the organization and operation of the database system 10-1 will now be described. As discussed above, the manufacturing of assembly board products requires that the control parameters associated with the various steps in the processes used be defined in some manner and then recorded so that it can be used to control manufacturing processes. Manufacturing facilities can be organized in various manners and the more complex the complement of equipment and the organization, the more difficult it becomes to manage the control of such processes in an efficient manner. FIGS. 3a through 3d illustrate several different organizations.

Figure 3A:
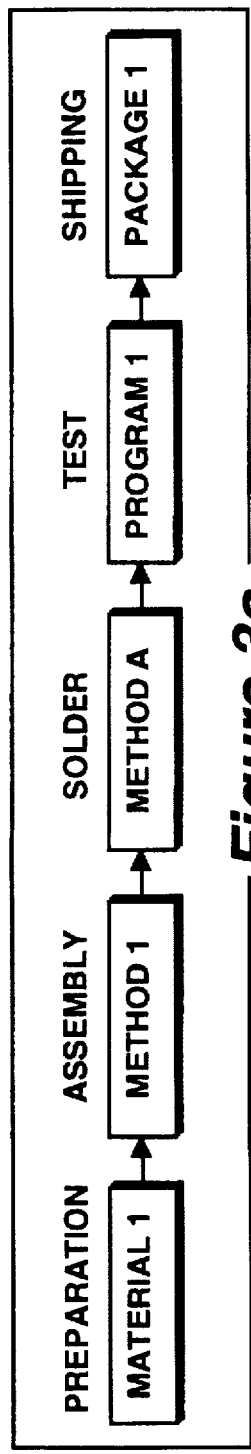
FIGS. 3a through 3d illustrate different types of manufacturing processes which can be facilitated by the teachings of the present invention and further how a common set of parameter information can be shared by two different products.
Figure 3B:
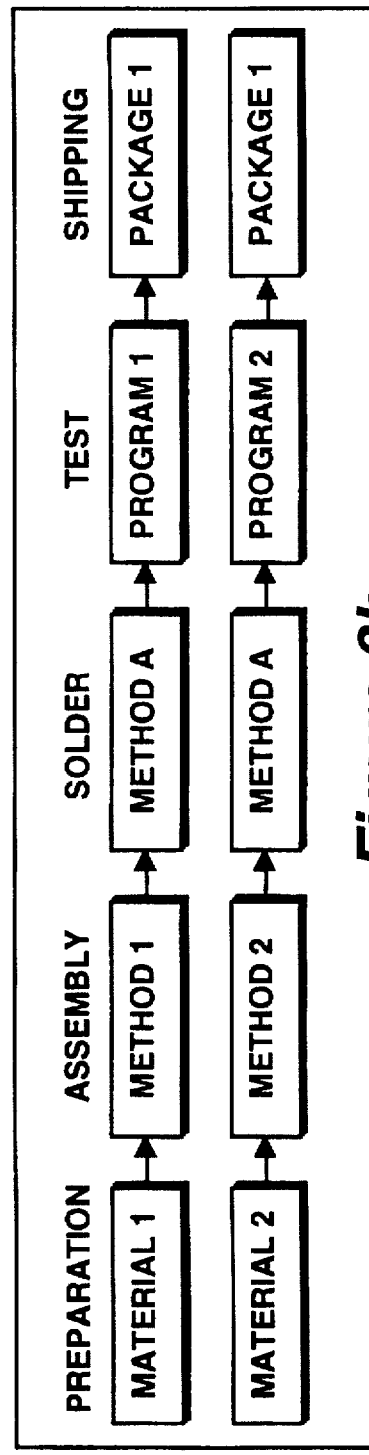

FIG. 3a depicts the simplest organization where the complement of equipment in a manufacturing facility is set up to provide for the assembly, solder, inspection and shipping of one assembly board product for one customer. FIG. 3b depicts an organization where the complement of equipment in the manufacturing facility is set up to manufacture several different products. Here, it becomes necessary to provide specific parameters for each product such that actions are taken by that operation for that product at that step of the operation.

Figure 3C:
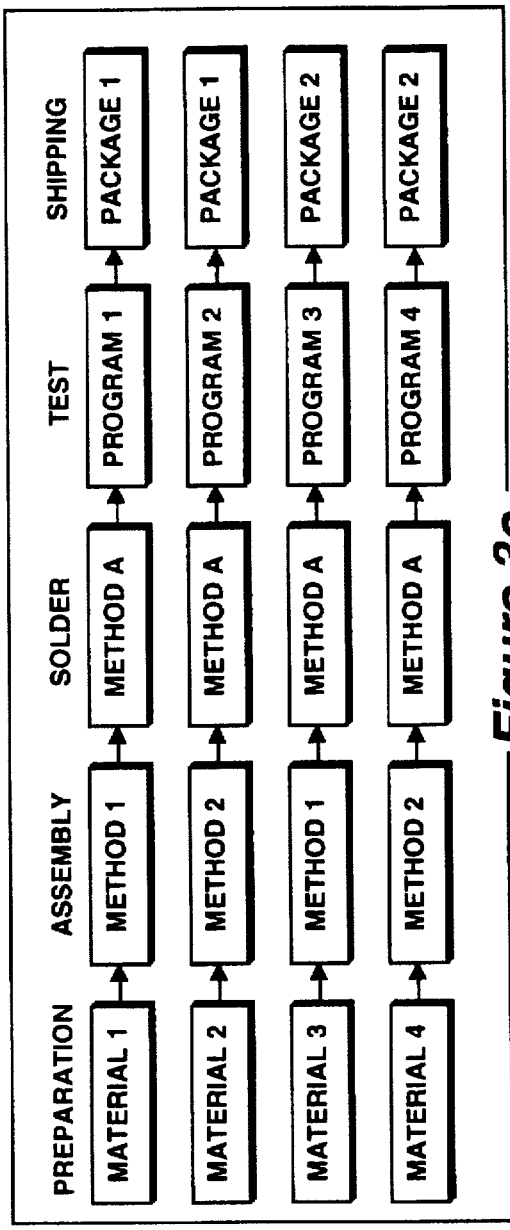

FIG. 3c depicts a manufacturing facility in which the complement of equipment is set up to manufacture a plurality of different products for two different customers. In such cases, it may be required to tailor the individual manufacturing steps to meet specific customer requirements. For this type of situation, the management and control of information is quite complex and will steadily increase as the number of products and customers increase.

Figure 3D:
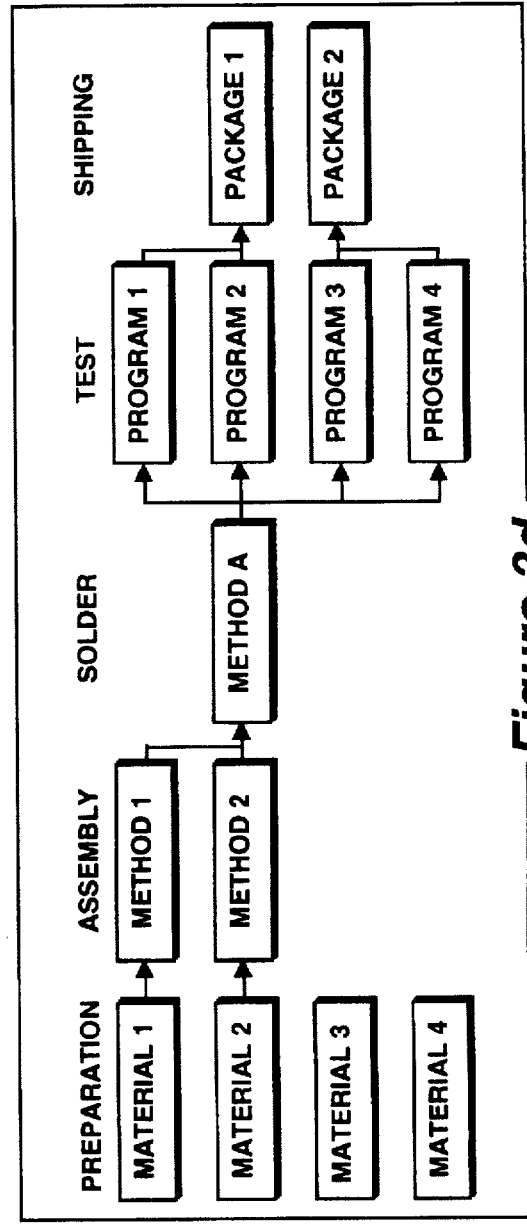

The preferred embodiment of the database system of the present invention allows the efficient organization and management of process control parameters in such complex organizations in a way that common requirements whether they pertain to process, product or customer specific requirements can be efficiently managed. That is, the process can be defined as depicted in FIG. 3d or in any combination that is possible between the process organization depicted in FIG. 3c and the process organization depicted in FIG. 3d. This is accomplished by employing the set of memory database structures of FIGS. 2a and 2b and invoking the linking and copying control mechanisms of block 250 included in the database system 10-1 of FIG. 1.

To carry out such process control management according to the teachings of the present invention, a typical database application process uses the memory structure illustrated in FIG. 2a. In a typical application, and as illustrated in FIG. 2a, PROD__235, Rev 3, Ver A of the Product List table (200) has a recipe code defined as 5111509152. As indicated, the recipe code serves as a pointer to the appropriate recipe table entries in the recipe table structure 220. There are 4 entries defined in the Recipe List table structure (220) and as further defined by entries (221, 222, 223, & 224).

As indicated in FIG. 2a, the individual designated units of equipment (e.g. 4081, 9823, 2643, & 4317) of assembly line A of FIG. 1 are defined in data base table structure stored in a section of memory as indicated in FIG. 2a.. This table structure is located in the database system 10-1 and is accessed or referenced through the unit designation fields defined for this factory environment of FIG. 1.

As illustrated in FIG. 2a, the parameter list table structure 230 which contains operating control parameter information for the process related to the actual product being manufactured at a particular unit is defined by a unique parameter key value derived by combining the unit designation value (e.g. 4081, 9823, 2643, 4317) with a unique parameter designation value (e.g. 011, 014, 002, 007) to define specifically, a unique set of parameters for manufacturing product x on that unit of equipment. As indicated, the parameter key value serves as a pointer to the appropriate entries into the parameter table structure 230.

As previously discussed, in typical manufacturing situations, units of equipment of the different assembly lines of FIG. 1 may possess identical operating characteristics allowing a particular set of parameters to be applied to all units of equipment which produce that assembly board product. The present invention, allows the use of different product names or designations which provides the advantage of simplifying the operations or procedures in setting up processes for new products.

Similarly, two different assembly board products may require utilization of the sane or identical set of process parameters when manufactured on a given unit of equipment. In this case, the database system of the present invention allows the sharing of the same or common process control parameters.

The memory structures which enable the linking of parameter sets are illustrated in FIG. 2a, and the memory structures which enable copying control parameter data are illustrated in FIG. 2b. The parameter table entry (232) FIG. 2a illustrates the database memory structure for having two different products share the same set of process parameters. More specifically, the same unit of equipment (4111) parameters stored in memory section 2 of product list table 200 and the product control parameters stored in memory section 4 can be utilized in performing the last step or operation for manufacturing products defined as PROD__235, Rev 3, Ver A and for PROD__U123, Rev A, Ver A built on assembly line A of FIG. 1. In such instances the database system of the preferred embodiment allows an operator to relate the appropriate steps of the two products together through the linking control mechanism of block 250. When so linked, the operator is automatically alerted when making changes to the process control parameters pertaining to the particular product or to the designated unit of equipment that such control parameters are also being shared. At that time, the operator can make an informed decision as whether or not linking should be maintained. The memory structures also facilitate tracking process changes as discussed herein.

The memory structures of FIG. 2b illustrate the memory organization for enabling a copying control mechanism of block 250 where a particular set of product parameters may be replicated to support the manufacture of the same product on a different manufacturing line. As shown, product PROD__235, Rev 3, Ver A specifies a particular set of parameters for step 1000, (Unit 4081) of the process for producing this board on assembly line A. These same parameters would apply equally to the manufacture of the unit at step 1000, (Unit 3411) of assembly line B. The copy mechanism of the preferred embodiment allows for the replication of these control parameters as depicted in FIG. 2B. As shown, the control pare data contained in parameter set 4081M011__0 (231) matches the control parameter data contained in parameter set 3411M006__0 (233).

Figure 6:
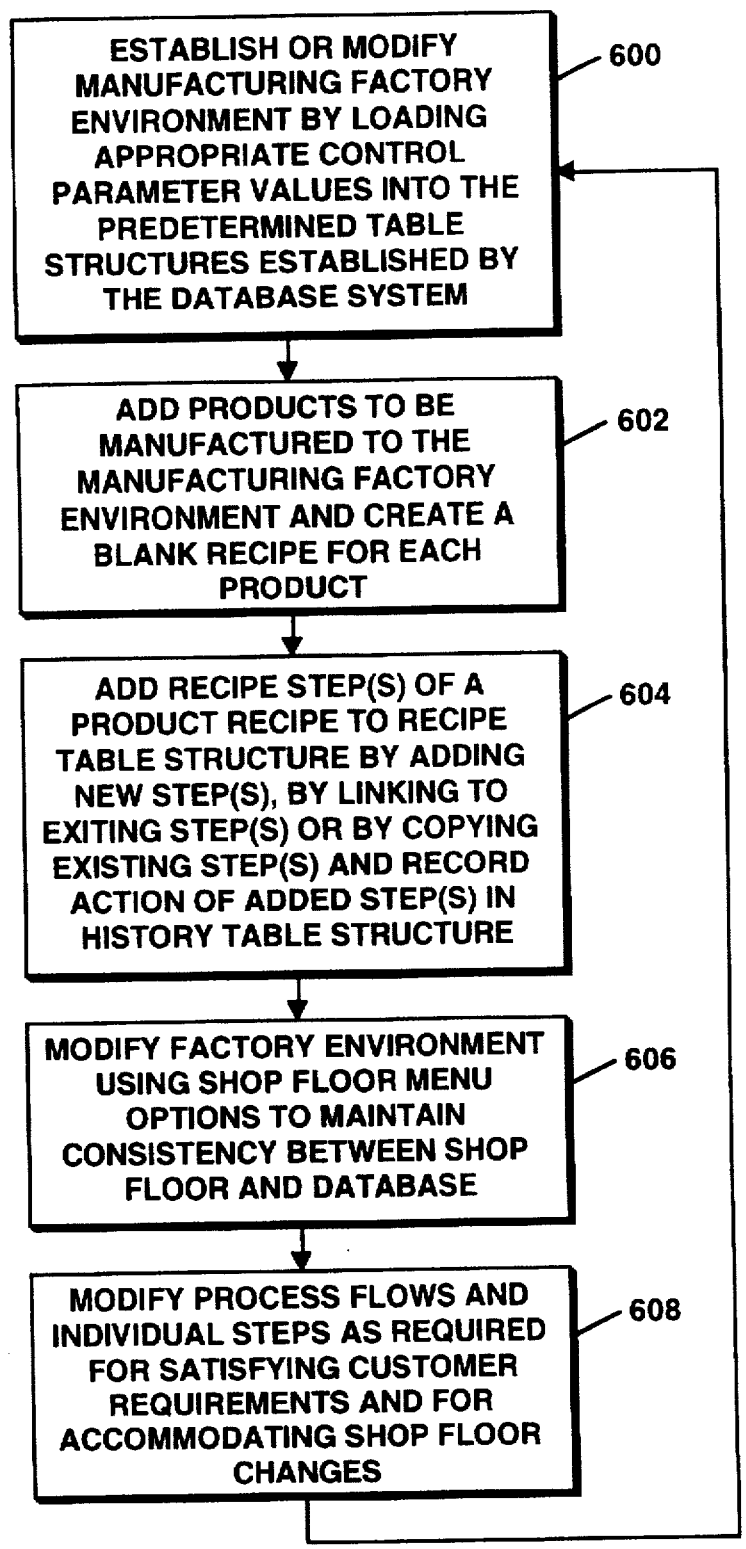
FIG. 6 illustrates the overall operational flow of the database system of the present invention.

FIG. 6 Overall Flow

FIG. 6 illustrates a typical application of the database system 10-1. The overall flow has been broken down into several phases as indicated in blocks 600 through 608. As indicated by block 600, when the database system 10-1 is first started up, a series of operations are initiated wherein the initially empty table structures of memory 10-110 are loaded with the appropriate control parameter values. These values essentially establish the factory floor operating environment.

Here it is assumed that a single entry has been entered into the user table structure which authorizes a particular person to perform the functions of an administrator. In greater detail, the administrator generates the appropriate series of commands to the database system 10-1 which allows access to the different memory structures. During such access, the administrator enters the appropriate control parameters into the line list table structure locations for defining the complement of equipment units to be utilized on single manufacturing line setup in the factory.

As indicated in block 602, the administrator enters the control parameters into the product list table structure to define one or more products to be manufactured and create a blank recipe for each product. Next, the administrator enters control parameters defining the new steps of a first recipe to be used in manufacturing the first product consistent with the operations code parameters specified for the units of equipment designated in the line list table structure. Next, the administrator during the entering of the steps defines the set of parameters that are going to be used to manufacture that product at that specific step. The set of control parameters are stored in the parameter table structure which is to be applied to the recipe for manufacturing the specified product. Additionally, the administrator loads the appropriate access control entries into the user table structure for defining specific authorization levels assigned to those users which are to be given access to the database system 10-1.

The administrator continues to define any other products which are going to be manufactured on the line. As indicated in block 604, in defining the recipe steps for manufacturing a new product, the administrator has the option of applying the steps of an existing product as well as applying the same set of parameters. In greater detail, the administrator first adds the new product by issuing an add product command to the database system 10-1 as further discussed herein which in turn provides access to the product table structure 200. The operator then enters the appropriate control parameters into a next one of the available product table locations.

Once these operations are completed, the administrator next issues commands to the database system 10-1 for adding the product recipe steps to the recipe table structure. The database system 10-1 responds to such commands by providing access to the line list table structure which the administrator can utilize in generating the appropriate steps of the recipe to be used in manufacturing the new product. As indicated in blocks 606 and 608, authorized operators can easily modify the factory environment to accommodate equipment changes or modify process flows and individual steps as required to accommodate customer requirements. For example, an operator can change the set of parameters used in manufacturing that new product at any recipe step.

The control mechanisms included in the database system of the preferred embodiment which operate in conjunction with the database memory structures illustrated in FIGS. 2a and 2b in carrying out the operations of adding steps and changing step parameters in carrying out the operations of blocks 604 and 608 of FIG. 6 will now be described in greater detail with reference to the flowcharts of FIGS. 4a and 4b.

By way of example, it is assumed that an operator has decided to manufacture a new board product (U123) on assembly line A. The operator has already added two of the total of four steps (i.e. "1000"-preparation step and "2000"-assembly step) of the product recipe to be used for manufacturing that board product. Next, it is assumed that the operator has decided to add the third step which is a test operation step which is the same or similar to the test step "3000" used in manufacturing a board product on assembly line B.

Figure 4A:
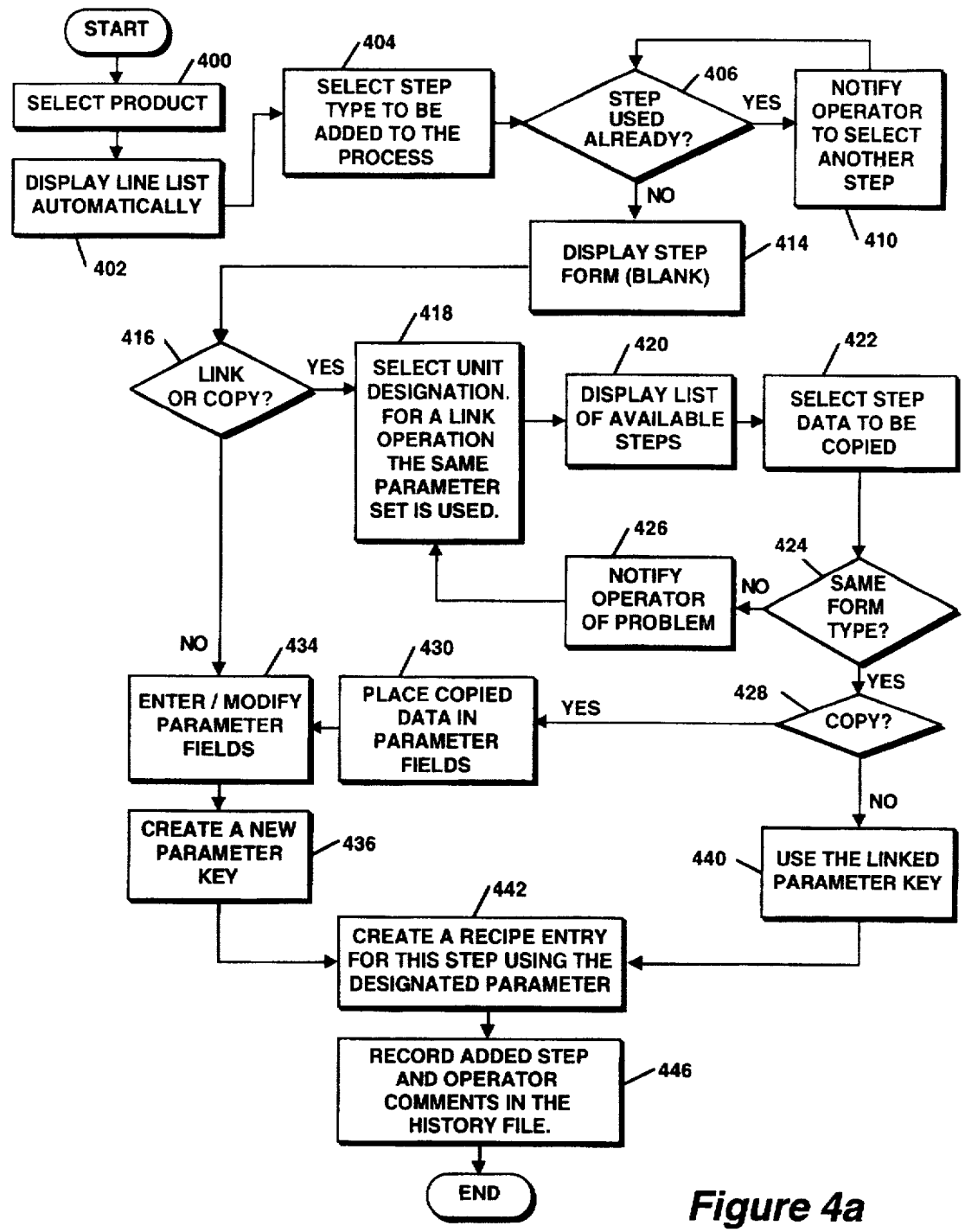
FIGS. 4a and 4b are flow diagrams used to explain the operation of the present invention.
Figure 5A:
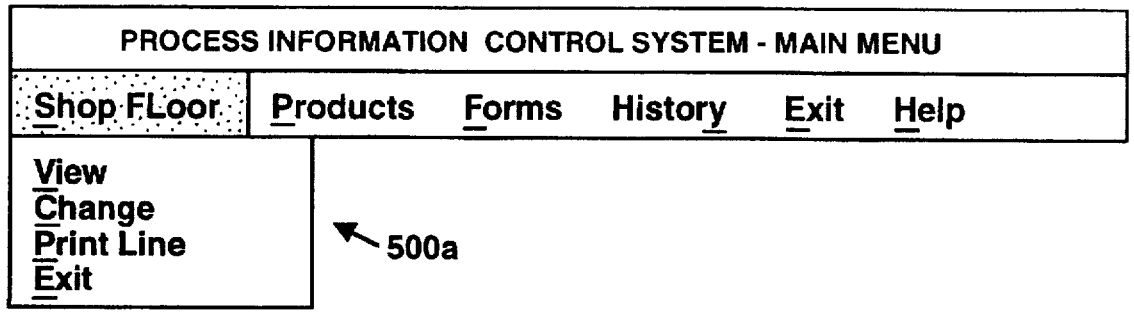
Figure 5A:
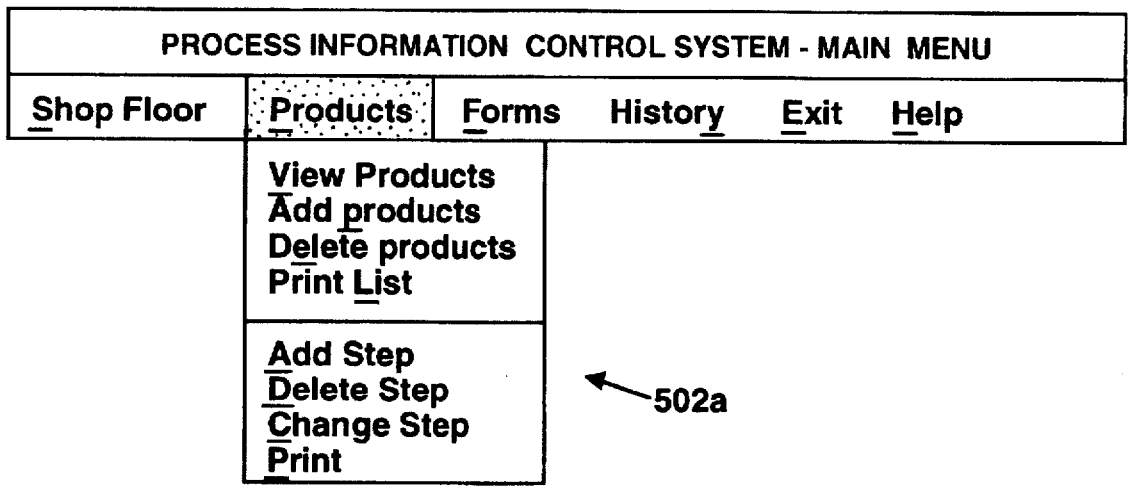

Before describing the actions taken by the operator with reference to FIG. 4a, reference is first made to FIG. 5a. This figure illustrates the format of the main menu and the different command selections which are displayed to an operator. As indicated, an operator can select to generate menu commands perform operations associated with three of the categories of labeled items displayed in the top line of the menu. These items are "Shop Floor", "Product", "Forms" and "History". There is also an exit function provided by selecting the "Exit" labeled item. The "Shop Floor" category provides access to the line list table structure which includes entries defining the complement of units of equipment installed on the factory shop floor. The "Product" category provides access to the product list table structure which includes the entries defining all of the different board products being manufactured on assembly lines A, B and N. The "Forms" category provides access to the different table structures for carrying out form management functions. Since this category is not relevant to an understanding of the present invention, it will not be discussed further herein. The "History" category provides access to the history table structure which includes entries for maintaining a record of process changes.

FIG. 4a-Add a Step Operation

Prior to adding the new product steps, the operator may want to review what units of equipment are available for manufacturing the board product on assembly line A and the particular operations/steps being performed by such units. This can be done by selecting the "Shop Floor" labeled item of FIG. 5a which results in the display of pull down menu 500a. Next, the operator selects "view" which results in the display of menu 500b of FIG. 5b. From this menu, the operator is able to view the units of equipment of assembly lines A, B and N.

As indicated in FIG. 5b, assembly line A contains 4 units of equipment identified by numerical values 4081, 9823, 2643 and 4317. These units of equipment perform the operations/steps identified by sequence numbers (operations codes) 1000 through 8000 as shown. Also, a brief description of each step/operation is provided to the operator. Thus, the operator can view the specific details of the test step to be added by selecting the step and clicking once on that selection using mouse 10-104. This action results in the display of menu 502b of FIG. 5b which contains further details provided by fields "line name" through "training_req" as indicated.

Assuming the operator is satisfied that test step "3000" will fill the established requirements, the operator next performs the series of operations of FIG. 4a. As indicated in block 400, the operator first selects the product to which test step 3000 is being added. This is done by first selecting "Product" on the main menu of FIG. 5a by clicking once on the "Product" labeled item using mouse 10-104. This results in the display of pull down menu 502a containing the list of product related menu commands. The operator next selects the "view products" command which indicates to the database system 10-1 that the U123 is the product to which test step 3000 is being added. The selection of "view products" results in the display of menu 500c of FIG. 5c containing the entries of the Product List Table Structure.

Next, the operator selects the entry PROD_U123, Rev A, Ver A as indicated in FIG. 5c. To verify that the product selection is the desired one, the operator can simply click once on that entry with mouse 10-104. This results in the display of menu 502c which contains the product specific details stored in fields Prod_design through File_date as illustrated in FIG. 5c. To view the current process flow for that product the operator can Double Click on the selection PROD_U123 Rev A, Ver A of menu 500c to obtain the menu display 504c of FIG. 5c which represents the current process detail, if any, for the product selected in the menu 500c. When the operator has selected the product and the process detail, this causes the Add step command in pull down menu 502a of FIG. 5a to become visible to the operator. Up until product selection and subsequent process detail display, this command as well as the other listed step related commands are represented on the screen in gray instead of black signifying that the commands exist but for one or more reasons the current system or authority level will not allow them to be used.

Figure 5E:
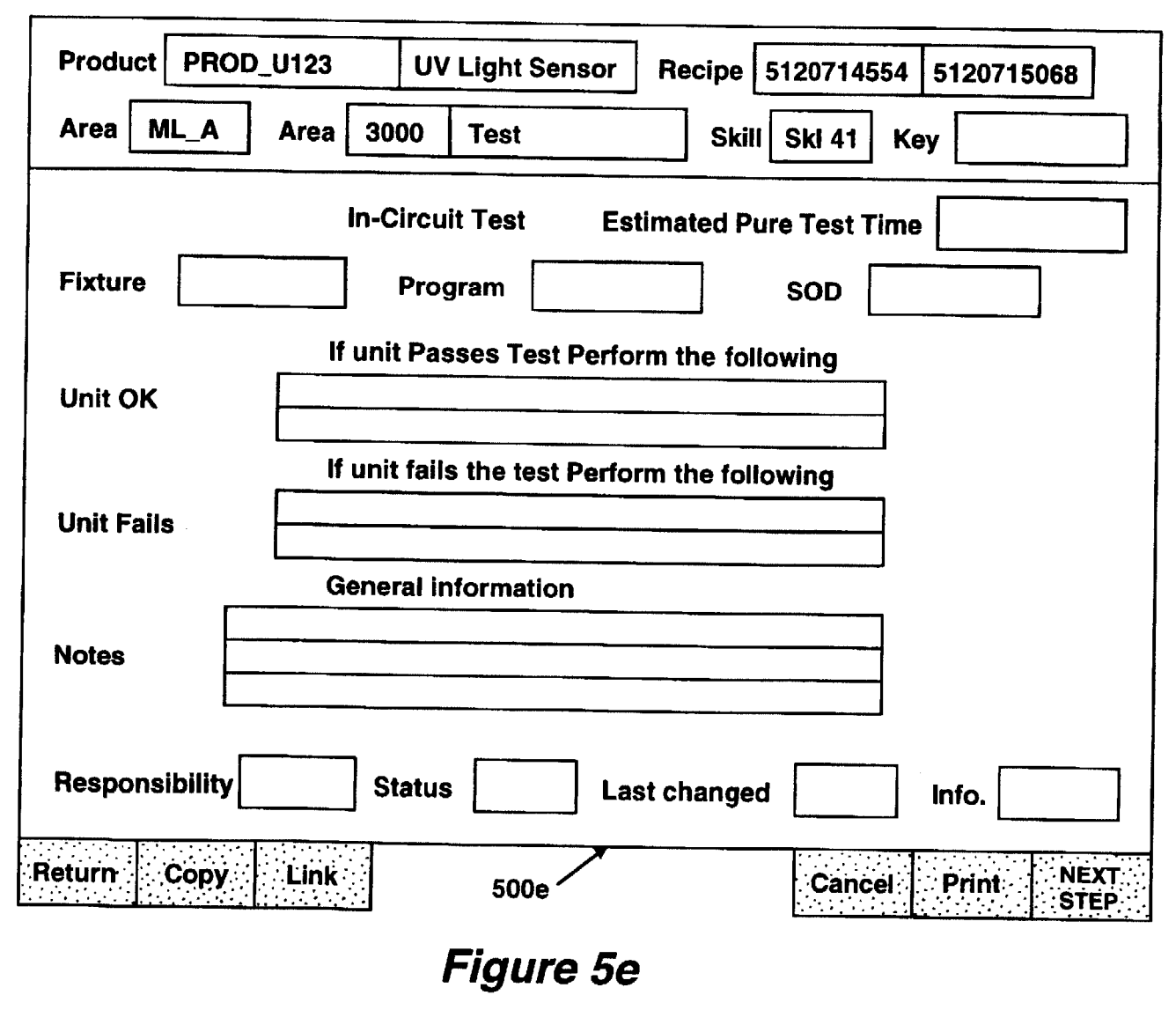

As indicated by block 404 of FIG. 4a, the operator next issues an add step command to the database system 10-1 which results in the exchange of menu block. This results in the display of the line list menu 500d as indicated in FIG. 5d. The database system 10-1 automatically displays the line list menu 500d in lieu of the product list portion being displayed as indicated in block 404 of FIG. 4a. This allows the operator to make selections from those steps currently being used in the manufacture of product boards on assembly lines A through N. At this point, the database system 10-1 makes visible, a number of buttons on the menu form in addition to the return button as shown in FIG. 5e. These include a cancel button which allows the operator the opportunity to change the selection already made. As illustrated herein, the database system 10-1 also displays a Print button which is used to print detail parameter information screens on printer 10-2.

The preferred embodiment of the present invention also includes a Next Step button which is used when viewing step detail forms. When selected by an operator, this issues an internal command to the database system 10-1 which causes it to display the next step of the product receipe in place of the current recipe step being displayed. When the last step is reached, the database system 10-1 prompts the operator with a message and returns to displaying the first step in the current product recipe.

In the present example, the operator selects test step "3000" as the type of step to be added to the recipe/process as indicated in block 404 of FIG. 4a. This is done by highlighting the test step item of menu 504d and then selecting the return button at the bottom of the menu form. Up until the selection of the return button, the operator can elect any one of the available choices. Upon the selection of the return button, the operator is now committed to completing the add step operation sequence. The selection of the return button causes the generation of the add step command to the database system 10-1.

The database system will then verify that the step being added does not already exist. This is performed at block 406 of FIG. 4a. Should the step number already exist the operator will be notified and allowed to redefine a new step number for this activity or to select another activity as indicated in block 410.

After verifying that the step sequence number is not already in use, the system then displays the actual step stylized form which is to store the step parameters as indicated in block 414. A representation of this form is shown in FIG. 5e as menu form 500e. In this example, the menu form 500e would be blank since this is the first time that this type of step is being added to a new product (i.e. it is a new step). When form 500e is displayed, the database system also makes visible, two buttons, copy and link. As indicated in FIG. 4a, the operator at this point has the choices of manually entering a series of parameters via keyboard (i.e. block 434) or copying or linking existing parameters from an existing step (i.e. block 416).

By selecting the copy button via mouse 10-104, the operator causes the generation of a copy step command to the database system 10-1 causing the system to execute the copy sequence flow path of FIG. 4a. This results in the display of a menu outlining the available steps which could be used for the COPY or LINK function as indicated in block 420. This menu is displayed above the original form and is represented as item 504f in FIG. 5f. Selecting an item from this menu will result in the data being placed in the appropriate parameter fields. This ultimately enables the operator selected parameters of an exiting recipe step to be copied into a menu form similar to form 500e of FIG. 5e.

By selecting the link button via mouse 10-104, the operator causes the generation of a link step command to the database system 10-1 which causes the execution of the link sequence path of FIG. 4a. This ultimately enables the operator selected parameters of an existing recipe step which uses the same unit of equipment to be linked to the recipe of the U123 product. This permits the, U123 product to use exactly the same set of parameters that are being used by one or more other board products. The selecting of either the copy or link button causes the database system 10-1 to make visible, a cancel button on the bottom of the menu form. This allows the operator to change or switch among the choices of manually entering parameters, copying parameters or linking parameters.

In the present example, the operator has decided to copy the parameters for test step 3000. In this case, the operator selects the copy button which causes the database system 10-1 to generates a request to the operator to define the unit from which the parameters are to be copied. The operator responds via keyboard 10-102 of FIG. 1 as indicated in block 418 of FIG. 4a. The operator may enter another unit designation or accept the default value which is that of the current unit having the add step function performed.

Before system 10-1 allows the execution of the operations of block 426, it verifies by comparing the unit_type codes that the parameters to be copied are being copied for use with the same type of unit of equipment form as indicated in block 424. For example, the database system 10-1 would prevent the copying of parameter data contained in a manual assembly step form into the fields of a general assembly step form.

Following such verification, the database system 10-1 displays a new menu box 504f which is superimposed over the menu 500f of FIG. 5f which asks which parameter items contained in the existing test step are to be copied. As the operator clicks on each item with mouse 10-104, the control parameters associated with the item appears in a portion of the background area of the form. The operator from the fields displayed can determine whether or not to select the item. Once having selected the desired items, the operator clicks on a return button which is always visible on the form. In this example, since the operator previously selected to copy the parameters of test step 3000, the database system 10-1 based on the results of block 428 now performs the operations of block 430. That is, the system 10-1 copies the selected parameters and displays them on the menu form 500e.

At that time, the operator can make any desired modifications. For example, the operator may want to modify certain instructions. After making all desired modifications, the operator will click on the return button. The database system 10-1 responds by performing the operations of block 436. That is, the database system 10-1 makes a duplicate of all of the modified and unmodified control parameters of the test step being added to the U123 product recipe and assigns a new parameter series number to this new test step. As indicated in block 442 of FIG. 4a, the database system 10-1 next performs the required operations for attaching the new test step to the U123 product recipe.

In the present example, the database system 10-1 performs the attach operation. Attaching is accomplished by writing the duplicated parameter set into the appropriate location of the parameter list table structure 230 as defined by the assigned new parameter number. The database system 10-1 adds the step entry to the appropriate location in the U123 product portion of the recipe list table structure as defined by the step's sequence number value. At this point, the add step operation is complete except for entering a record in the history table structure 245.

A similar sequence of operations takes place if the operator chooses to use the link function to add the test step to the U123 product recipe. That is, the operator selects the step parameter data of the test step 3000 to be linked as indicated in block 420. Since this a link operation, the database system 10-1 only allows linking between pa sets of a specific unit designation and no operator intervention is provided.

As indicated in block 434, for a link function, the database system 10-1 makes a copy of the parameter series number of the selected step which is going to be linked to the U123 product recipe. Therefore, in carrying out the attach step of block 442, the database system 10-1 just has to add the appropriate entry to the recipe list table structure 220 at the location defined by the predefined sequence number assigned to that step.

The last option provided for adding the test step to the U123 product recipe is selected when the operator elects to manually enter the control parameters into the fields of the recipe table structure 220 which are to be associated with the test step as indicated in block 420. Similar to the copy function, the database system 10-1 assigns a new parameter series number to the operator created test step and also verifies that the step being added does not already exist in the U123 product recipe (i.e. block 406). Then the database system 10-1 attaches the step by writing the set of operator manually entered control parameters into the appropriate location of the parameter list table structure 230 as defined by the value of the assigned new parameter series number. The database system 10-1 then adds the step entry with that new parameter series number value to the appropriate location in the U123 product section of the recipe list table structure 230.

As indicate in FIG. 4a, the database system 10-1 performs the operations of block 446 following the attachment of each step added to a recipe/process for maintaining a chronological history file of recipe changes. More specifically, the database system 10-1 creates a history file entry containing a time and date code in addition to data indicating what parameters were changed and the operator's description of the nature of such changes. The database system 10-1 then stores the file entry in a last location of the time and date organize history table structure 245 according to the value of the assigned time and date code. At this point, the entire add step sequence is deemed completed by the database system 10-1.

Figure 4B:
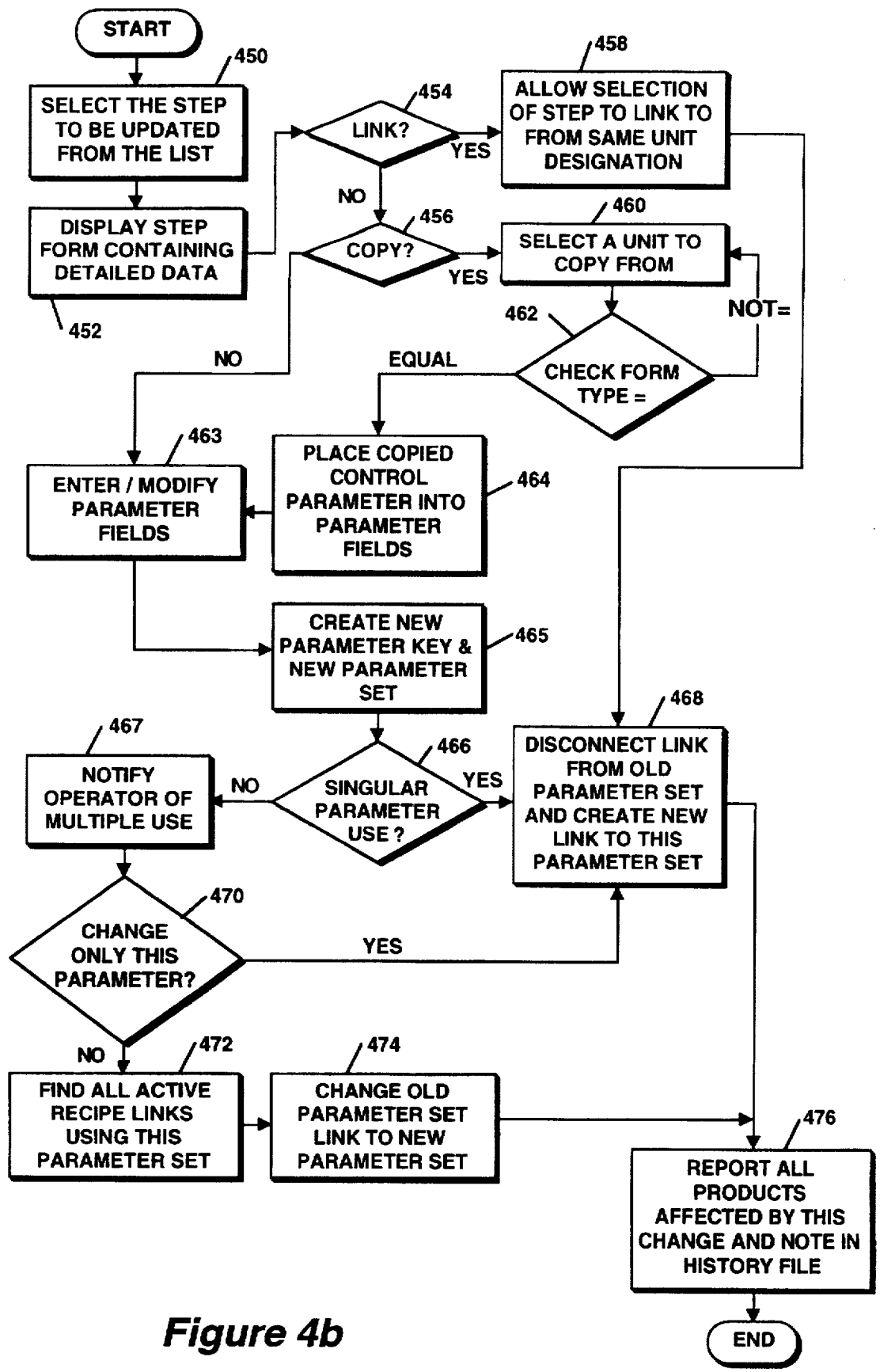

FIG. 4b Change Step Operation

FIG. 4b illustrates the sequence of operations performed in modifying a particular recipe step. The operator has the option of changing one or all of the control parameters associated with that recipe step, the staring point for the sequence is the me as that for adding a step. That is, the operator has to select the product whose recipe step is being changed. Therefore, the operator will be presented with menus similar to the menus 500d and 502c of FIG. 5c. The line list entries of menu 504d are not displayed since the operator has initiated a change step operation and thus will be making a change to an existing step.

As indicated in block 450, the operator selects the step to be updated from the displayed recipe list table entries in the manner previously described relative to the add step operation. The system also gives the operator the option of canceling that operation or selecting the menu's return button. At this point, the operator is committed to completing the change step operation. The selection of the return button, causes the database system 10-1 to present to the operator, the display step form containing detailed control parameters in menu form similar to the menu 500e of FIG. 5e as indicated in block 452. Next, the database system 10-1 enables the operator to choose the way in which the desired parameter changes are to be made. That is, similar to the add step sequence, the operator can make such change by linking, copying or manually changing control parameters as indicated in blocks 454 through 464. Again, the database system 10-1 verifies that the operator is using the correct form type as indicated in block 462.

As indicated in block 465, the database system 10-1 creates a completely new set of parameters even though they may be the same as the old set in order to preserve historical data. It used the UNIT designation prefix in creating the set of parameters. More specifically, it searches through entries in the recipe table structure 220 and determines the correct parameter key number for that UNIT designation.

The database system 10-1 determines by counting the number of units using that particular set of parameters. The database 10-1 determines if there is a single use of the original parameter set as indicated in block 466. If there is only a single use, then the database system 10-1 performs the operations of block 468. That is, it disconnects or severs the link (i.e. original parameter series number) from the old parameter set and creates a new link (i.e. a new parameter series number) to the new parameter set. The database system 10-1 then reports all products affected by the change and stores an entry in the history table structure 245 as indicated in block 476. This operation is performed in the same manner as in the add step sequence.

If the determination in block 466 was that there is more than a single use of the parameter set being changed, then the database system 10-1 indicates the number of recipes affected and notifies the operator of the multiple use as indicated in block 467. The database system 10-1 then asks the operator if the change is to be made only to this particular parameter set as indicated in block 470. If it is, then the database system 10-1 sequences to block 468 and performs the above described operations as indicated in FIG. 4b.

When the change is being made to all of the recipe parameter sets, the database system 10-1 scans the recipe list table structure 220 and determines all of the active recipe links (i.e. parameter series numbers) which use that parameter set (i.e. contains the same parameter key value) as indicated in block 472. Next, as indicated in block 474, the database system 10-1 changes the old parameter set link (i.e. parameter series number) in each of the affected active recipes in the recipe list table structure 220. That is, it updates the recipe list entries to now be associated with the new parameter set of the modified step.

From the above, it is seen that any time an operator makes a change to a step, the database system 10-1 automatically scans the recipe list table structure 220 to determine which products are being affected by any change being made a control parameter and then notifies the operator of this fact.

This ensures that the operator has the necessary factors in hand to properly evaluate the impact of such change on products currently being manufactured using those processes. The database system 10-1 generates this control information by first determining which recipes are being affected by the change and uses this information to determine which products are in turn being affected. In this manner, the database system 10-1 structures are organized so that such tracking can be accomplished in an efficient and reliable manner.

It can be seen from the above how the database system of the present invention provides an operator with the ability to manage the processes, products and complement of equipment units for manufacturing a large number of different types of board products on a plurality of manufacturing lines in a highly efficient and reliable manner. The database system of the present invention provides a number of verification mechanisms which assist an operator in managing a given manufacturing environment through an easy to use graphical user interface.

It will be appreciated by those skilled in the art that many changes may be made to the preferred embodiment of the present invention without departing from the teachings. For example, the teachings are not limited to a particular complement of equipment units or to any partitioning of such units. Further, the teachings of the present invention are not limited to a particular set of board products or processes. Also, the teachings are not limited to any particular format or representations or commands or graphical interface implementations.

APPENDIX TABLE OF CONTENTS

I. Examples of Equipment and Operations
II. Examples of Table Structures
III. Description of Internal commands
IV. Example Form Types

SECTION I

Examples of Equipment and Operations

Listing of available process steps contained in the shop floor list for a given manufacturing line. The type and quantity of equipment units will vary from line to line.

General Instructions
Pre_form
Board Bake
Material issue to production
Adhesive dispense
Solder paste bottom side of board
Inspect deposition
Component placement (up to 5 individual steps)
Placement inspection
Solder reflow bottom side of board
Bottom side of board reflow inspection
Solder paste top side of side
Inspect deposition
Component placement (up to 5 individual steps)
Placement inspection
Solder reflow top side of board
Top side inspection
Manual Masking (solder resist)
Radial insertion
Manual Assembly (0 to 15 operations)
Manual verification
Wave solder—no clean
Wave Solder—OA Flux
Cleaning
Touch up
After solder assembly (0 to 6 operations)
Final Inspection
In-Circuit test
Final test
Post test assembly
Final audit
Packaging
Shipment

SECTION II
Examples of Table Structures

Data base entries

A. LINE LIST TABLE STRUCTURE Values (See FIG. 2 item 210)
    Global ll_ln As String '12 Line_name
    Global ll_ud As String '08 Unit_desig (Control #)
    Global ll_un As String '32 Unit_name (text)
    Global ll_sn As Integer' Seq_numb (operation #)
    Global ll_ut As String ' 8 Unit_type (name of form
    Global ll_ms As String '16 Maint_SOD
    Global ll_tr As String ' 8 training requirements
'PICSDATA
B. PRODUCT LIST TABLE STRUCTURE 200
    ' Prod_listing
    Global pl_pd As String '16 Prod_desig
    Global pl_rv As String ' 4 Prod_rev
    Global pl_vr As String ' 4 Prod_ver
    Global pl_gn As String '20 Generic_name
    Global pl_ex As String '20 Customer_info
    Global pl_bs As String ' 4 Bld_status
    Global pl_pr As String '10 Prod_recipe
    Global pl_di As String '10 Current_rev
    Global pl_dl As String '10 Previous_rev
    Global pl_cm As String '40 Comments
    Global pl_sl As String ' 8 Source location
    Global pl_rd As String '12 File_date
'PICSDATA
C. RECIPE TABLE STRUCTURE 220
    ' Recipe List
    Global rl_rn As String '10 Recipe_name
    Global rl_rs As String '4 Recipe_seq
    Global rl_pn As Integer' Parameters (# of detail entries)
    Global rl_pk As String '10 Parameter_key (Name)
    Global rl_if As String '12 Info (text file for info)
    Global rl_ud As String ' 8 Unit_Desig
    Global rl_rv As String '10 Recipe_rev
    Global rl_is As String ' 8 Item status (Ready, Veri, etc)
    Global rl_mp As String '10 Master person
    Global rl_rp As String '16 Revision person
'PICSPRAM
D. PARAMETER TABLE STRUCTURES 231,232,233 & 234ml
    ' Param_maink
        Note defined use is suggested.
    Global pm_pm As String '10 Param_main
    Global pm_sn As String '15 SOD_number
    Global pm_pn As String '15 Prog_numb
    Global pn_fd As String '50 Fixt_desig
    Global pm_mt As String '50 Material
    Global pm_st As String '50 Setup
    Global pm_dr As String '50 Dir_travel
    Global pm_sp As String '50 Speed
    Global pm_ot As Siring '50 Other
    Global pm_r1 As String '50 Ref_01
    Global pm_r2 As String '50 Ref_02
    Global pm_nt As String '80 Notes -continued SECTION II
Examples of Table Structures Data base entries 'PICSPRAM
E. PARAMETER TABLE STRUCTURES 234d1 & d2
' Param_detlk There can be up to 8 of them
Global pd_pd(8) As String '10 Param_detl
Global pd_d1(8) As String '15 Detail_01
Global pd_d2(8) As String '15 Detail_02
Global pd_d3(8) As String '15 Detail_03
Global pd_d4(8) As String '15 Detail_04
Global pd_d5(8) As String '15 Detail_05
Global pd_d6(8) As String '15 Detail_06
Global pd_d7(8) As String '15 Detail_07
Global pd_d8(8) As String '15 Detail_08

SECTION III.

Description of Internal Commands

The following is a listing of internal commands used to control the sequence of operations executed by the data base system 10-1 in response to the selection of commands made by an operator/user and accompanying selections of menu displayed items resulting from selected table structures and lists. For example, selecting the add_step command sets the menu command to a value of "32".

1. Global Const MC_LINE_VIEW=11=Allows an operator to view/display the contents of the line list table.

2. Global Const MC_LINE_ADD=12=Allows an operator to add an entry specifying a new piece or unit of equipment to the line list table.

3. Global Const MC_LINE_DEL=13=Allows an operator to delete an entry specifying a piece of equipment from the line list table.

4. Global Const MC_LINE_CHANGE=14=Allows an operator to make changes to the complement of manufacturing equipment.

5. Global Const MC_LINE_UPDATE=15=Allows an operator to update information pertaining to an existing unit of equipment.

6. Global Const MC_PRODUCT_VIEW=21=Allows an operator to view/display the contents of the product listing table.

7. Global Const MC_PRODUCT_ADD=22=Allows an operator to add an entry specifying a new product to the product listing table.

8. Global Const MC_PRODUCT_DELETE=23=Allows an operator to delete a product entry from the product listing table.

9. Global Const MC_PRODUCT_CHANGE=24= Allows an operator to change fields within a product listed in the product listing table.

10. Global Const MC_PRODUCT_LINK=25=Allows an operator to link one product to another in the product listing table.

11. Global Const MC_PRODUCT_MASTER=26= Allows an operator to add a product to the product listing table using some previously defined product.

12. Global Const MC_VIEW_STEPS=31=Allows an operator to view the steps of a product recipe in the recipe list table.

13. Global Const MC_ADD_STEP=32=Allows an operator to add a step to a product recipe in the recipe list table.

14. Global Const MC_DELETE_STEP=33=Allows an operator to delete a step from a product recipe in the recipe list table.

15. Global Const MC_CHANGE_STEP=34=Allows an operator to change a step in a product recipe in the recipe list table.

16. Global Const MC_LINK_STEP=36=Allows an operator to change a parameter(s) of a recipe step in the set of parameters stored in the main or detailed parameter table.

17. Global Const MC_PRINT_STATUS=38=Allows an operator to print out the status of a product recipe.

18. Global Const MC_PRINT_DETAIL=39=Allows an operator to print out the the detail data screens for the currently defined product.

19. Global Const MC_COPY_STEPS=41=Allows an operator to copy a recipe step in the recipe list table in creating a new recipe. (part I—preparation)

20. Global Const MC_COPY_STEPS2=42=Allows an operator to copy a recipe step in the recipe list table in creating a new recipe. (part 2—execution)

21. Global Const MC_VIEW_FORMS=58=Allows an operator to view the different form types available in the system.

22. Global Const MC_WERE_USED=68=Allows an operator to determine where an item is used within the table structures of the database system.

23. Global Const MC_VIEW_HISTORY=71=Allows an operator to view the history table structure.

| SECTION IV Form Type Examples | |
|---|---|
| ADH_DGL5 | Form for the Fuji GL5 glue dispenser |
| ADH_DUIC | Form for the UIC (DEK) screen printer |
| CHP_4785 | Form for the Sanyo 4785 SMT placement system |
| CP3_CP4P | Form for the CP3 & CP4 chip placement units |
| CP6_FUJI | Form for the CP6 Fuji chip placer |
| FNC_TEST | Functional test form |
| GEN_INST | General instruction form format. Provides general instructions |
| ICT_TEST | In circuit test form format |
| INSP_INS | Inspection instruction form |
| IP1_IP2P | Form for the Fuji precision placement units IP1/IP2 |
| MAN_ASMB | Manual assembly form describes up to 16 assembly operations |
| MAN_MASK | Masking instruction form for placing solder mask on assemblies. |
| PRE_FORM | Pre form instructions for up to 8 components |
| SLD_ERSA | ERSA form agrees with button layout on system. |
| SLD_HXL7 | Hollis XL7 form conforms to setup instructions for machine. |
| SLD_PSTE | General purpose solder paste dispensing instruction form |
| SLD_RFLW | Reflow instruction form defining all detail information |
| SLD_WAVE | Wave solder setup instructions form format. |

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A database implemented method for managing processes within a manufacturing factory environment for manufacturing a number of board products, the factory environment including a complement of equipment units physically partitioned into a number of manufacturing lines whose operation are controlled by a database system including a memory, the method comprising the steps of:

(a) assigning each unit of equipment at each physical location, a unique unit designation code which is different from the designation codes assigned to all other equipment units within the complement of equipment units;

(b) assigning each unit of equipment, an operation code identifying the process step performed by the unit of equipment in manufacturing a hypothetical product wherein same operation code may be assigned to another equipment unit;

(c) initializing the database system memory to contain a predetermined set of database table structures and a control mechanism, each table structure including a plurality of memory locations, the predetermined set of database table structures including line equipment, product, recipe and parameter list table structures;

(d) invoking the control mechanism for storing in an initial number of memory locations of the line equipment list table structure, coded entries defining those units of equipment of the complement of equipment units which are to be used in manufacturing board products and their assigned operations codes;

(e) next, invoking the control mechanism for storing in a number of the memory locations of the product table structure, a number of coded entries defining a corresponding number of board products to be manufactured which contain coded recipe code values used to relate product memory location entries to memory locations in the recipe table structure by identifying which recipe step operations are to be used in manufacturing the board products; and, (f) next, invoking the control mechanism for storing in a number of the memory locations of the recipe table structure, a unique set of coded entries designating a sequence of step operation of the recipe for manufacturing the board product derived from using the units of equipment stored in the line list table structure to perform designated operations, each coded entry containing a parameter key value used to relate the recipe steps to memory locations in the parameter table structure containing sets of parameters for setting up the designated unit of equipment for performing the recipe step operations in manufacturing the specific board products.

2. The method of claim 1 wherein the method further includes the step of:

(g) invoking the database system control mechanism for adding or changing equipment units, products, recipes and control parameters as required for maintaining consistency between the factory environment and for satisfying customer requirements.

3. The database method of claim 1 wherein the line equipment list table structure entries are organized for viewing according to manufacturing line and wherein each memory location entry has a plurality of fields, a first field for storing a line name value coded for designating the line on which the unit of equipment is being used, a second field for storing a sequence number code corresponding to the operations code specifying the step performed by the equipment unit and a third field for storing a unit designation name coded for specifying the type of equipment unit or station activity.

4. The database method of claim 1 wherein the memory locations of the product table structure are organized for viewing according to product type and wherein each memory location entry has a plurality of fields, a first field for storing a product designation value defining the board product type and a second field for storing the recipe code designating which recipe will be used in manufacturing the board product.

5. The database method of claim 1 wherein the memory locations of the recipe table structure are organized for viewing according to recipe code number and wherein each entry has a plurality of fields, a first field for storing the parameter key value for accessing the set of parameters associated with the entry.

6. The database method of claim 1 wherein the memory locations of the parameter table structure is organized as two table structures, a main parameter table structure for storing up to a predetermined number of main control parameters and a detail parameter table structure for storing additional control parameters when the predetermined number of the main parameter table is exceeded.

7. The database method of claim 2 wherein step (g) further includes performing a first predetermined sequence in response to an operator initiated add step command generated following selection of a product from the product table structure, the database system in performing the first of the predetermined sequences, first displays the entries of the line list table structure for enabling selection of the type of step to be added to the recipe.

8. The database method of claim 7 wherein the database system in performing the first predetermined sequence verifies that the selection of the type of step to be added to the recipe does not already exist and generates a notification message for enabling selection of another step when the selected step already exists.

9. The database method of claim 8 wherein the database system in performing the first predetermined sequence displays a plurality of menu choices.

10. The database method of claim 9 wherein the plurality of choices includes adding the type of step by copying or linking to an existing step or manually creating the step to be added.

11. The database method of claim 10 wherein the database system in response the selection of the link menu choice performs the steps of:

(1) generating a parameter key value which corresponds to the set of parameters of the existing step selected to be linked; and, (2) accessing a location in the first one of the predetermined table structures using the parameter key value generated step (1) for storing an entry designating the step being added to the recipe which contains the parameter key value of step (1) for effecting linking.

12. The database method of claim 10 wherein the database system in response to the selection of a copy menu choice performs the steps of:

(1) copying the control parameters of the existing step selected to be added to the recipe;

(2) enabling modification of the control parameters copied in step (1);

(3) generating a parameter key value which corresponds to a new parameter key for storing the copied and modified control parameters obtained from the parameter table structure being used by the recipe; and, (4) accessing a location in the recipe table structure using the parameter key value for storing an entry designating the step being added to the recipe containing the new parameter key value.

13. The database method of claim 10 wherein in response to a linking or coping menu selection, the database system verifies that the selected step is of the same form as the previously selected step type and generates a notification message for enabling selection of another step when the selected step is detected as being incompatible.

14. The database method of claim 2 wherein step (g) further includes performing a second predetermined sequence in response to an operator initiated change step command generated following selection of a product from the product table structure, the database system in performing the second of the predetermined sequences, first displays the step selected to be changed and a plurality of menu choices for making changes to the selected step.

15. The method of claim 14 wherein the choices include changing the step by copying or linking a set of parameters associated with another existing step or manually creating a set of parameters for the selected step.

16. The method of claim 14 wherein the database system in response to the selection of the link menu choice performs the steps of:
   (1) removing the original link parameter key value from the old parameter set; and,
   (2) creating a new link parameter key value to the parameter set to which the step being changed is now linked.

17. The method of claim 14 wherein the database in response to the selection of either a copy menu choice or manual entry performs the steps of:
   (1) creating a new parameter key value and a new parameter set;
   (2) generating a first indication signaling when the change is to be made only to a single set of parameters;
   (3) in response to a first indication in step (2), replacing the original link parameter key value from the old parameter set with a newly created link parameter key value;
   (4) in the absence of a first indication in step (2), notifying operator of multiple use for receipt of second indication signaling when the change is to be made to only this parameter set;
   (5) in response to the second indication in step (4), repeating step (3);
   (6) in the absence of the second indication in step (4), scanning the database structures for locating all active recipes containing the original link parameter key value; and,
   (7) repeating step (3) for all active recipe links by changing the original link parameter key value to the new link parameter key value.

18. The method of claim 17 wherein the method further includes the steps of:
   (8) identifying all products affected by the change using the recipe codes of the affected active recipes; and
   (9) recording all products affected by the change in a history table structure.

19. A database system method for managing processes used to manufacture a plurality of electronic assembly products with different units of a complement of equipment on a number of manufacturing lines which include specific ones of the different units of equipment, the method comprising the steps of:
   (a) uniquely identifying each unit of the complement of equipment at a physical location by a unit designation code;
   (b) assigning each piece of equipment identified in step (a) an operations code identifying the process step performed by the identified piece of equipment in manufacturing a hypothetical product requiring a preestablished sequence of steps or actions;
   (c) generating and storing in a database system memory, a number of database table structures, one of the structures corresponding to a set of recipe tables having a plurality of locations for storing a number of recipes to be used in manufacturing the number of different products on the number of manufacturing lines, each recipe containing a unique set of coded data entries designating a sequence of steps or actions for manufacturing a specific product using specified pieces of equipment, each coded data entry containing a plurality of fields, a first field coded to specify a sequence number designating a particular recipe step, a second field coded to specify the unit designation code value representing a particular one of the complement of different units of equipment selected to perform the step and a third field coded to specify a parameter key value designating a unique set of parameters for setting up the designated equipment unit carrying out the recipe step as specified by the operations code; and,
   (d) accessing the tables generated and stored in step (c) for making changes to the recipes used in manufacturing the plurality of board products on the number of manufacturing lines to meet customer requirements.

20. The method of claim 19 wherein the third field is generated by combining the second field with a unique numerical value in a predetermined manner.

21. The method of claim 20 wherein the predetermined manner corresponds to using the second field as a base value and the unique numerical value as an index value.

22. The method of claim 19 wherein the database system further includes a product list table containing a number of entries operatively linked to the set of recipe tables, each entry storing an address value for referencing a different one of the set of recipes in response to an unique operator generated product code value.

23. The method of claim 22 wherein the database system further includes a first control mechanism operatively coupled to the set of recipe tables and wherein the method further includes the steps of:
   (e) generating a predetermined product code value for accessing a specific one of the recipe tables through the product list table used for manufacturing a particular product; and,
   (f) invoking the first control mechanism for generating a predetermined sequence of operations for adding or deleting entries from the accessed recipe table as required for updating the process for manufacturing the particular product.

24. The method of claim 19 wherein the database system further includes a print control mechanism and said method further includes the step of:
   (g) invoking the print control mechanism for printing out a selected one of the number of recipes in a predetermined format for inclusion with the manufactured product as a process summary document.

25. The method of claim 24 wherein the predetermined format indicates the latest changes made to the recipe.

26. The method of claim 19 wherein the database system further includes a second control mechanism for generating a recipe code containing a plurality of digits coded for indicating the date the recipe was last generated for storage in the recipe table.

27. The method of claim 26 wherein the second control mechanism further generates a revision code containing a plurality of digits coded to indicate the latest revision for tracking process changes for storage in the recipe table.

28. The method of claim 19 wherein the database system further includes a third control mechanism operatively coupled to the set of tables and wherein the method further includes the steps of:

(h) invoking the third control mechanism for managing links between a number of recipes which contain the same set of parameters for manufacturing a corresponding number of different products; and, (i) automatically updating each of the number of recipes linked in step (h) to reflect any modifications made to a selected one of the number of recipes for improving the process used in manufacturing a particular product.

29. The method of claim 28 wherein step (h) includes establishing, reestablishing or severing links between a number of recipes.

30. The method of claim 29 wherein step (i) further includes the step of:

generating indications coded to specify which ones of the number of recipes was initially changed for storage in a history table.

31. The method of claim 19 wherein the database system further includes a control mechanism for copying a set of parameters used to manufacture a first product which are to be applied in manufacturing a second product, the control mechanism being operatively coupled to the initial set of tables and wherein the method further includes the steps of:

(j) accessing a specific one of the tables associated with the first product whose parameters are to be copied;

(k) invoking the copy mechanism a first time;

(l) selecting and modifying the data entries of the recipe contained in the table which are to be applied to a new product; and, (m) invoking the control mechanism a second time causing the replacement and deletion of a selected set of parameters in the recipe table of the second product with the corresponding modified data entries of step (l) thereby canceling out data entries of a prior manufacturing process.

32. The method of claim 31 wherein the method further includes the step of:

(n) scanning the database system for recipes containing the same selected set of parameters used by other products; and, (o) displaying in turn each recipe which uses parameters contained in the selected set of parameters for enabling application of the selected modified parameters to the other products.

33. The method of claim 31 wherein the method further includes the step of:

(p) generating and displaying a warning notice to a user after step (m) for enabling the user to confirm that the process used in manufacturing the second product is to be changed by applying the modified parameters to the second product recipe.

34. The method of claim 33 wherein the method further includes the step of:

(q) generating and displaying a visual indication of the use of the same set of parameters on both the first and second products.

35. A database system for managing processes used to manufacture a plurality of electronic assembly products with different units of a complement of equipment partitioned into a number of manufacturing lines, each unit of the complement of equipment at a physical location being uniquely identified by a unit designation code and assigned an operations code identifying the process step performed by the identified piece of equipment in manufacturing a hypothetical product requiring a preestablished sequence of steps or actions; the database system comprising:

(a) a first memory section for storing a predetermined set of table structures stored in the memory, one table structure containing a number of groups of locations for storing a corresponding number of recipes to be used for manufacturing the number of different products on the number of manufacturing lines, each group of locations contains a unique set of coded data entries designating a sequence of steps or actions defining a different one of the number of recipes for manufacturing a specific product using specified pieces of equipment, each coded data entry containing a plurality of fields, a first field coded to specify a sequence number designating a particular recipe step, a second field coded to specify the unit designation code value representing a particular one of the complement of different units of equipment and a third field coded to specify a parameter key value designating a unique set of parameters for setting up the equipment unit designated by the designation code to carry out the recipe step specified by the operations code for manufacturing the specific product;

(b) a second memory section for storing a number of control mechanisms for accessing the tables in the first memory section for making changes to the recipes used in manufacturing the plurality of board products on the number of manufacturing lines to meet customer demands; and, (c) a graphical display interface operatively coupled to the first and second sections of memory for displaying recipe related forms for guiding an operator in making changes by invoking specific ones of the control mechanisms.

\* \* \* \* \*